Figure 1:
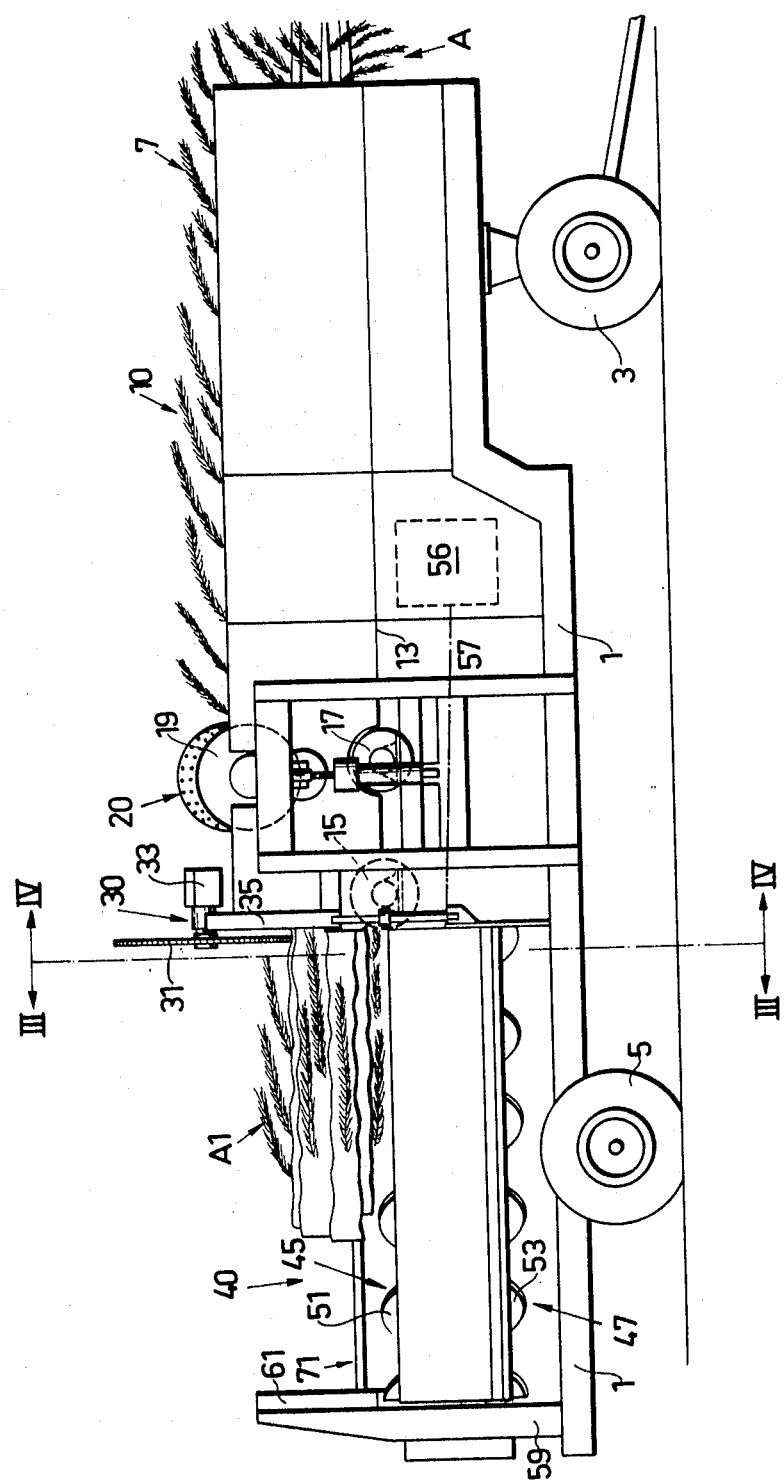

United States Patent

[11] 3,624,756

| [72] | Inventor | Per Gustaf Mellgren<br>Soderhamn, Sweden |
|---|---|---|
| [21] | Appl. No. | 869,810 |
| [22] | Filed | Oct. 27, 1969 |
| [45] | Patented | Nov. 30, 1971 |
| [73] | Assignee | Kockum Soderhamn Aktiebolag<br>Soderham, Sweden |
| [32] | Priority | Nov. 13, 1968 |
| [33] | | Sweden |
| [31] | | 15401/68 |

[54] APPARATUS FOR TREATING FELLED TREES
9 Claims, 5 Drawing Figs.

[52] U.S. Cl. ............................................. 144/2 Z,
143/46 F, 143/55 B, 144/246 F
[51] Int. Cl. ........................................... A01g 23/02
[50] Field of Search ............................. 144/2 Z, 3
D, 34, 309 AC, 208 R, 246 R, 246 D; 143/46 R, 46
F, 55 R, 55 A, 55 B, 56, 84 R

[56] References Cited
UNITED STATES PATENTS

| 2,821,220 | 1/1958 | Nicholson | 144/246 R |
|---|---|---|---|
| 2,889,858 | 6/1959 | Roberts | 143/46 R |
| 3,236,274 | 2/1966 | Eynon | 144/3 D |
| 3,385,331 | 5/1968 | Bronemo et al. | 144/2 Z |
| 3,500,882 | 3/1970 | Tanguay | 144/312 |

*Primary Examiner*—Gerald A. Dost
*Attorney*—Fred C. Philpitt

ABSTRACT: An apparatus for simultaneously treating a bunched group of undelimbed felled trees comprising in combination an elongated bin into which the bunched group of undelimbed trees is deposited and caused to crowd more closely together as they move in a downward direction and feeding means for feeding the bunched group out of said bin, said feeding means including a vertically movable upper roll.

APPARATUS FOR TREATING FELLED TREES

Known apparatuses for delimbing trees are generally adapted to be fed with one tree at a time where high quality of the delimbing treatment is required. The time required for the treatment of each tree is then almost equal for logs having small cross section as for logs having large cross section, so that the working capacity of the apparatus is approximately proportional to the volume of wood of the tree trunk.

The object of the present invention is to provide a simple apparatus for treating undelimbed trees which apparatus can be fed with several trees simultaneously and consequently has a very high working capacity.

The invention relates especially to an apparatus for simultaneous treatment of several undelimbed, unbarked trees which have not been cut and classified, i.e. trees in their state after felling on the logging site. The apparatus according to the invention is especially suitable for treating trees having small trunk cross section and intended for use as pulp-wood having a length of 2-6 m. and the like. In such case the apparatus can suitably be designed as a mobile apparatus so that it can easily be moved between various working sites, e.g., at or near the logging sites. However, it should be pointed out that the invention can also be applied to apparatuses for working bigger trees and that the apparatus can be designed as a stationary unit, e.g., as a unit in a log handling installation in connection with an industry based on wood as raw material.

The apparatus according to the invention is characterized by an elongated device for collecting and assembling several trees fed simultaneously from above to said device, the latter being adapted to bring together or crowd the trees to a considerable extend during the movement of the trees downwardly in said device, tree feeding means for simultaneously feeding several trees from the collecting device in the direction of length of the latter, said feeding means comprising a roll which is preferably driven and is carried by a movable holder, preferably a swingable arm and is adapted to be pressed against and to compress the bundle of trees which is fed out from said collecting device.

The most essential advantage with the apparatus according to the invention is that bundles of trees in a highly compressed state can be fed to an apparatus connected to said collecting device and intended for treatment, e.g., delimbing, of the trees. In such case it is not necessary to provide the latter apparatus with special means for collecting trees to be fed to the apparatus. During the crowding of the trees and the further compression brought about by said tree feeding means some limbs will be broken off, so that the following treatment, especially the cutting and delimbing treatment, of the trees is considerably facilitated and accelerated. Especially in the case of delimbing treatment the tree treating apparatus proper can suitably be of the type in which simultaneous treatment of several trees is possible. A suitable delimbing device of this type comprises one or more delimbing screws which extend along the tree to be treated.

Figure 2:
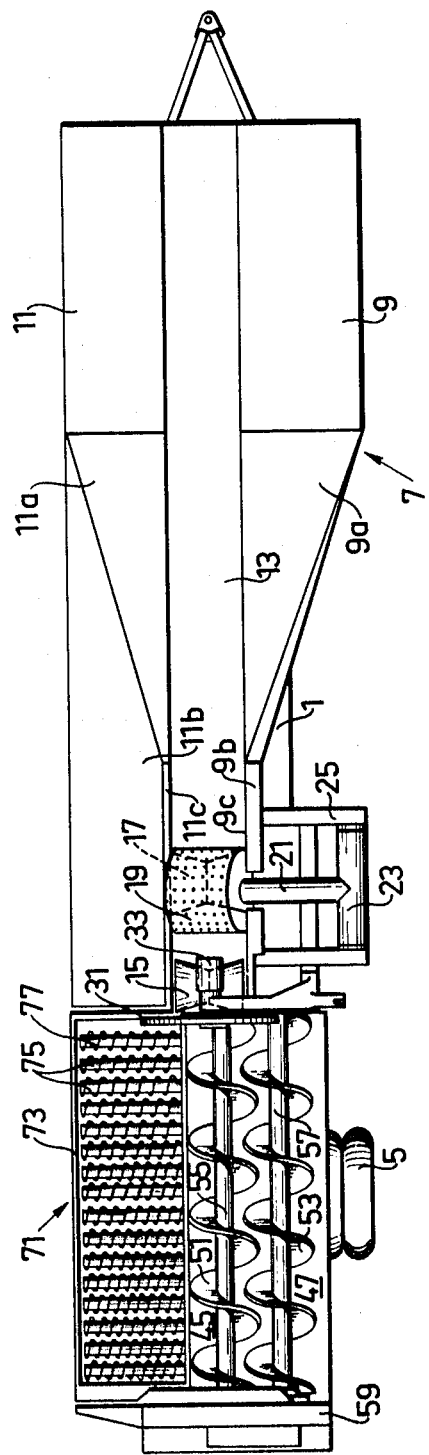
Figure 3:
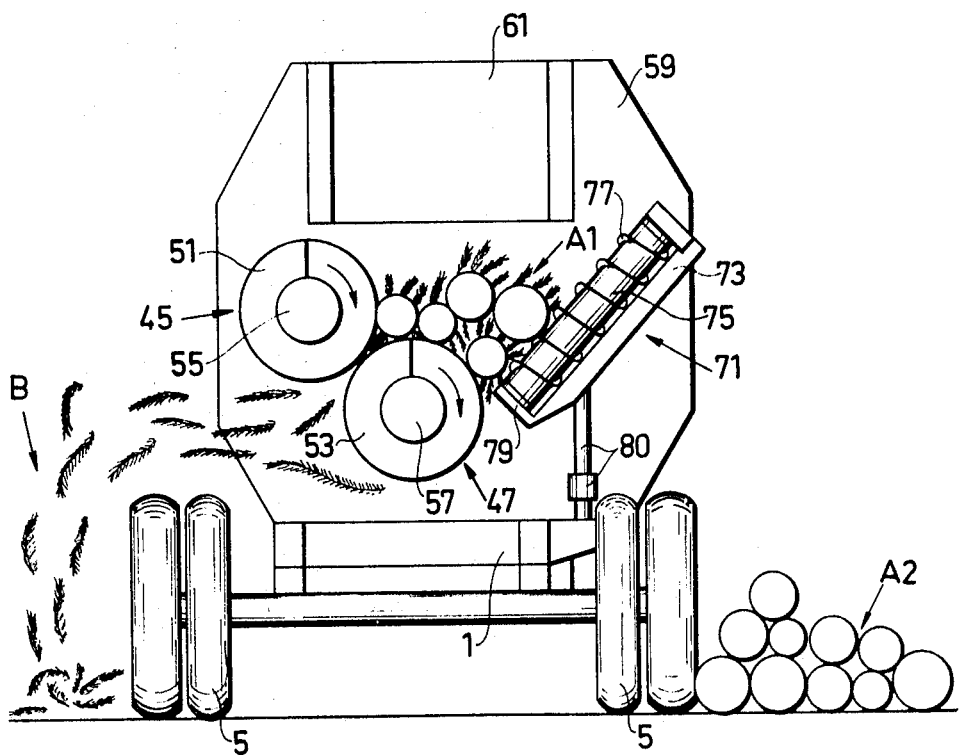
Figure 4:
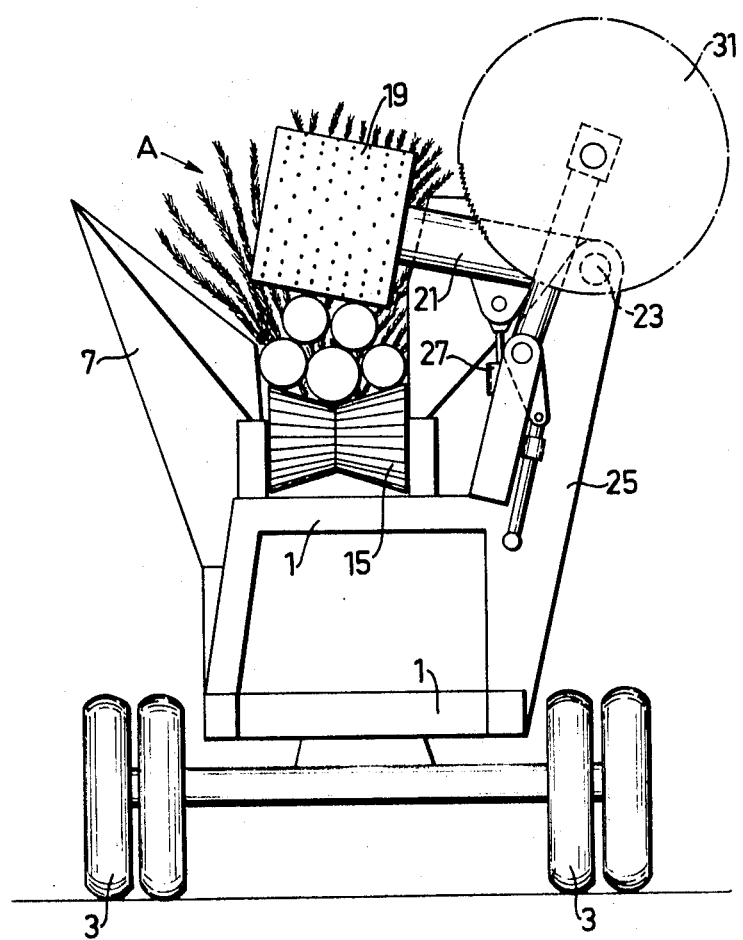
Figure 5:
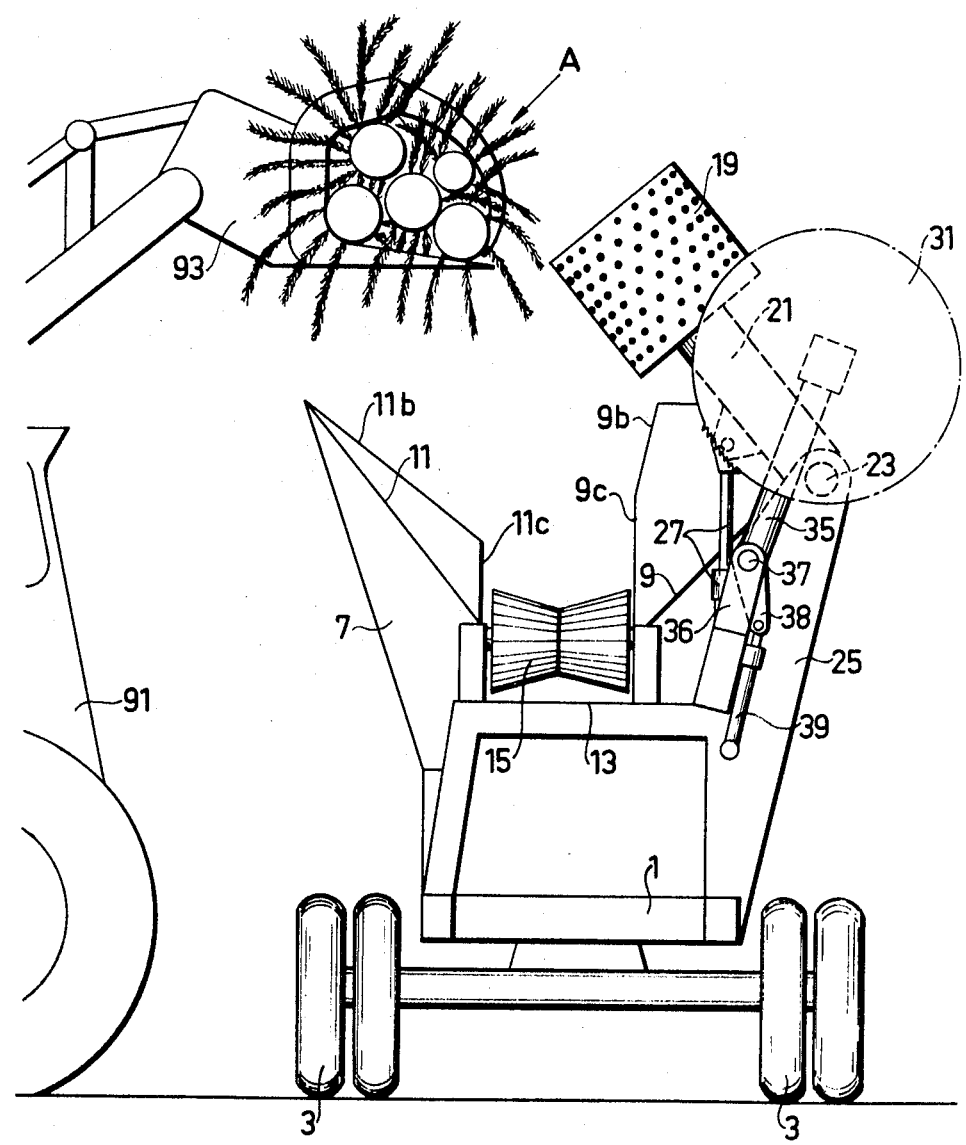

The invention will be described hereinbelow in more detail with reference to the accompanying drawings in which FIG. 1 is a side view of a mobile logging machine comprising a collecting device according to the invention and a delimbing apparatus connected thereto as well as a feeding means for trees and a cutting device, said logging machine being shown as fed with a number of untreated trees, FIG. 2 is a plane view of the logging machine according to FIG. 1, and without trees fed thereto, FIG. 3 shows a cross section of a logging machine according to FIGS. 1 and 2 corresponding to the section III—III in FIG. 1, FIG. 4 shows a cross section of the logging machine according to FIGS. 1 and 2 corresponding to the section IV—IV in FIG. 1, FIG. 5 shows the same cross section as FIG. 4 but with the log feeding means in idle position, FIG. 5 also showing a part of a loading truck with a tree gripling device for feeding trees to said logging machine.

The logging machine according to the embodiment shown comprises a frame 1 with steerable front wheels 3 and rear wheels 5. The logging machine comprises four main units, namely one unit 10 for collecting and crowding untreated trees, one unit 20 for feeding the trees, one unit 30 for cutting the trees and one unit 40 for treating the trees, the latter unit being shown as a delimbing apparatus.

The unit 10 consists of a tree collecting or capturing device 7 in the form of a trough, pocket, hopper or the like having a substantially horizontal bottom 13 and sidewalls of which different portions, as counted in the direction of length of the device, have different inclination in a direction upwardly and outwardly with respect to the bottom 13, the portion 9, 11 of said two sidewalls situated foremost of the logging machine having an inclination and extending to a height above said bottom 13 such that the distance between the upper parallel edges of the two wall portions is sufficient e.g., amounting to 1-2 m., or 2-5 times the average root end diameter of the logs, for the tree collecting device being capable of collecting without overspill, a bundle of approximately 5-10 undelimbed trees, which, when introduced into the collecting device, are held together approximately parallel with each other, e.g. by means of a gripling device of a loading truck. Wall portions 9a and 11a join the wall portions 9 and 11, respectively, and form transition portions to the foremost wall portions 9b, 11b, and 9c, 11c, respectively. The latter wall portions are situated at the portion of the logging machine where the tree feeding means 20 is arranged and extend perpendicular or nearly perpendicular to the substantially horizontal bottom 13 of the collecting device. The wall portions 9c and 11c do not extend right up to the upper edge of the collecting device but only up to a level required for a predetermined number of trees to be compressed and tightly crowded during the operation of the tree feeding means. Between the upper edge of the collecting device and the upper edge of the wall portions 9c, 11c the wall portions 9b and 11b extend upwardly and outwardly at different angles for facilitating the collecting of the trees when the latter are fed to the apparatus.

The tree feeding unit 20 comprises two lower, double-conical rolls 15 and 17 which may be driven or arranged to rotate freely about horizontal axes which are perpendicular to the direction of feed of the trees. Said rolls cooperate with an upwardly and downwardly movable roll 19 which is carried by a movable holder, namely an arm 21 swingably mounted at 23 on a upwardly directed projection 25 on the frame 1 of the logging machine. The roll 19 can in known manner be provided with log gripping pins or projections and may be freely rotatable but is preferably driven in a manner not shown, e.g. by means of a hydraulic motor. Swinging of the arm 21 upwardly and downwardly is effected by means of a hydraulic motor or cylinder 27. The axial length of the roll 19 and also that of the lower rolls 15, 17 is approximately equal to the distance between the wall portions 9c and 11c of the collecting device 7.

The cutting unit 30 comprises a circular saw blade 31 which is driven by a motor 33, suitably a hydraulic motor, and is carried by an upwardly and downwardly swingable arm 35 which by means of a pin 37 is pivotably mounted to a projection 36 on the frame 1 and has an extension 38 between which and the frame of the machine a hydraulic motor 39 is inserted. The saw blade 31 is driven with a speed and a torque such that the cutting of all logs in a bundle of logs may be carried out in a single working operation and preferably so quickly by means of the hydraulic motor 39 that the cutoff log sections fall straight downwardly without mentionable change in their direction of length and need not be supported, especially in order to avoid splitting the logs.

The log treating unit 40 comprises a delimbing unit with two elongated and parallel rotatable and driven delimbing members in the form of screws 45 and 47 which are provided with helical wall members 51 and 53 around their axes 55 and 57, respectively. At their periphery the wall members 51 and 53 are provided with preferably axially extending and preferably continuous sharp edges designed to cut off the tree branches extending into the space between said wall members and with abutment surfaces which are approximately parallel with the shaft of the screw and are intended to abut against the logs and prevent cutting off wood therefrom. The delimbing members are supported in a manner shown at one end thereof in bearings near the cutting device 30 and at the other end at upwardly extending plates 59 supported by the frame 1 of the machine. The delimbing members 45 and 47 may further be geared to each other so as to be driven with the same direction of rotation e.g., from a motor 56 schematically shown at the front end of the logging machine and via a transmission 57 likewise schematically shown, see FIG. 1. The delimbing member 45 is situated at a higher level than the delimbing member 47 and is situated at a greater distance from a vertical central plane lengthwise of the apparatus then the delimbing members 47. In order to keep the logs in contact with the delimbing members during the treatment and to provide some rotation of the logs an up- and downwardly swingable unit 71 has been provided which comprises a frame 73 the length of which corresponds to the length of the delimbing members and which is provided with a number of rolls 75 rotatably mounted approximately perpendicularly to the direction of length of the frame. The rolls are provided with helical flanges 77. Owing to repeated contacts between the logs and the rolls during the delimbing operation the logs will successively rotate in such a manner that the logs will become delimbed over their whole surface. The unit 71 may be swingably mounted at its lower long side 79 about a shaft which is parallel with the delimbing means or in any other manner the swinging moment upwards and downwards of the unit 71 being effected by means of a hydraulic motor 80 inserted between the unit 71 and the frame 1 of the machine.

The functioning of the shown logging machine according to the invention will now be described. By means of a truck 91 with gripping means 73 according to FIG. 5 the logging machine is fed with a bundle of trees A. The trees are inserted from above i.e., in a substantially vertical direction into the collecting device 10 with their direction of length approximately horizontal i.e., parallel with the direction of length of the collecting device, and preferably with their root ends facing the delimbing unit 40. During the movement of the trees downwardly in the collecting device the root ends of the trees are forced together and crowded so that they will arrive to a position approximately straight above the rolls 15 and 17 of the tree feeding device. Thereafter the movable and preferably driven roll 19 is swung downwardly and is pressed against the bundle of trees so that said bundle is compressed and is fed from the collecting device to the delimbing unit 40. The feeding is continued until the front ends of the logs abut against a stop plate 61 arranged at the remote end plate of the delimbing unit. By this operation the ends of the trees can be drawn even if desired. Thereafter the logs are cut by means of the saw blade 31 whereafter delimbing of the cut logs can be affected. After the logs have been delimbed the frame 73 with the rolls 75 is swung downwardly by means of the hydraulic motor 80 so that the logs A 1 which have been under treatment in the delimbing apparatus are screwn down to a stock A 2 of delimbed logs at the side of the logging machine. The branches cut off during the delimbing operation are thrown by the delimbing means to a branch pile B at the opposite side of the logging machine. It is evident that the feeding of the trees need not always be driven so far that the trees abut against the stop plate 61. If it is desired to delimb shorter logs the feeding of the bundle of trees can be stopped when the desired length of the logs has been fed into the delimbing apparatus whereafter the logs are cut. It may also be possible to arrange the stop plate so that it is adjustable in the direction of length of the delimbing apparatus so that exact, predetermined log sections can be obtained.

The logging machine according to the invention has a high working capacity also when fed only with logs having small cross dimensions, in contradistinction to known machines, and fundamentally the machine can be operated by one man. Since the machine is also simple and does not pose any manufacturing problems but can be manufactured at a relatively reasonable cost with respect to the total number of functions and the work it is capable of carrying out in forest areas with small as well as large trees, the invention represents a considerable improvement and a corresponding reduction of the log handling costs.

The invention is not restricted to the embodiment shown and described since the latter may be modified and varied in different manner within the scope of the invention. Thus, it may be mentioned that though the side walls comprised in the collecting device 10 preferably consist of smooth, unbroken plates or sheets also other wall constructions can be used, the important thing being that the walls do not show projections or openings in which the branches of the trees can get caught and thus hinder the feeding of the trees. The collecting device may consist of several, and if desired, different parts which may be arranged on a common frame which parts may be spaced from each other, e.g., several substantially U-formed, upwardly open elements—as seen in a plain perpendicular to the direction of length of apparatus—which elements may be arranged one after the other in the latter direction.

What we claim is:

1. An apparatus for simultaneously treating a bunched group of undelimbed felled trees, comprising in combination:
 a. an elongated bin which is adapted to receive a bunched group of undelimbed felled trees that are deposited therein from above said bin,
 b. said elongated bin being constructed so that the bunched group of undelimbed trees deposited therein is caused to crowd more closely together as the bunched group of undelimbed trees moves in a downward direction within said elongated bin, and
 c. feeding means for feeding a bunched group of undelimbed trees out of said elongated bin in a direction aligned with the longitudinal axis of said elongated bin,
 d. said feeding means comprising at least one lower roll and at least one cooperating upper roll,
 e. said upper roll being carried by a vertically movable supporting means, and
 f. means for pressing said upper roll against said bunched group of undelimbed trees during at least a portion of the time that the bunched group of undelimbed trees is being fed out of said elongated bin.

2. An apparatus according to claim 1, characterized in that said holder consists of a swingable arm pivotably mounted near one side of said device about an axis extending substantially parallel to the direction of length of said device.

3. An apparatus according to claim 1, characterized in that the collecting device comprises a bottom with relatively small bredth and sidewalls the main portions of which extending obliquely upward and outwardly from said bottom.

4. An apparatus according to claim 3, characterized in that said bottom and sidewalls at least predominantly consist of continuous smooth plates or the like which are free from openings or projecting portions which would prevent the feeding of the trees.

5. An apparatus according to claim 3 characterized in that the portions of the sidewalls situated near and on each side of the tree feeding means extend substantially vertically and are situated at a mutual distance approximately equal to the axial length of said roll.

6. An apparatus according to claim 1, characterized by a delimbing device connected to said collecting device and comprising at least one elongated rotatable delimbing member extending in the direction of length of the trees.

7. An apparatus according to claim 6, characterized by a tree cutting device arranged between the collecting device and the delimbing device and preferably consisting of a circular saw mounted on an up- and downwardly swingable arm carried by the frame structure of the apparatus.

8. An apparatus according to claim 1, characterized by a delimbing device connected to said collecting device and comprising at least one elongated, rotatable delimbing member extending in the direction of length of the trees, and further characterized by an elongated frame extending parallel to the delimbing member and swingable about an axis parallel to the delimbing member from an upper position in which the trees are held into contact with the delimbing member by said frame, to a lower position in which the delimbed trees are transmitted by said frame to a log stock at the side of said apparatus.

9. An apparatus according to claim 8, characterized in that said frame is provided with a number of rolls, extending parallel to each other and substantially perpendicular to the direction of length of said frame and provided with projecting wall portions with sharp edges, if desired, said rolls being adapted to rotate the trees during the delimbing operation.

* * * * *